United States Patent
Beuchert et al.

(10) Patent No.: US 9,305,117 B2
(45) Date of Patent: *Apr. 5, 2016

(54) STRING GENERATION TOOL

(71) Applicant: GLOBALFOUNDRIES U.S. 2 LLC, Hopewell Junction, NY (US)

(72) Inventors: Ritsuko Beuchert, Somerville, MA (US); Scott Boudreau, Littleton, MA (US); Richard H. Burns, Hingham, MA (US); Sheraz Rashid, Littleton, MA (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 114 days.

This patent is subject to a terminal disclaimer.

(21) Appl. No.: 14/072,983

(22) Filed: Nov. 6, 2013

(65) Prior Publication Data

US 2015/0095373 A1 Apr. 2, 2015

Related U.S. Application Data

(63) Continuation of application No. 14/042,083, filed on Sep. 30, 2013.

(51) Int. Cl.
*G06F 11/00* (2006.01)
*G06F 17/30* (2006.01)
*G06F 9/44* (2006.01)
*G06F 11/263* (2006.01)
*G06F 11/36* (2006.01)

(52) U.S. Cl.
CPC ............ *G06F 17/30985* (2013.01); *G06F 8/71* (2013.01); *G06F 11/263* (2013.01); *G06F 11/368* (2013.01); *G06F 11/3684* (2013.01)

(58) Field of Classification Search
CPC .............. G06F 9/44589; G06F 9/4451; G06F 9/44536; G06F 11/36; G06F 11/3684; G06F 17/2854

See application file for complete search history.

(56) References Cited

U.S. PATENT DOCUMENTS

| | | | |
|---|---|---|---|
| 7,272,822 B1 | 9/2007 | Riggins et al. | |
| 7,698,688 B2 * | 4/2010 | Fujiwara et al. | 717/126 |
| 8,311,800 B1 * | 11/2012 | Delaney et al. | 704/4 |
| 8,387,024 B2 * | 2/2013 | Urra et al. | 717/131 |
| 2005/0203935 A1 | 9/2005 | McArdle | |
| 2008/0082932 A1 | 4/2008 | Beumer | |
| 2008/0115111 A1 * | 5/2008 | Chang et al. | 717/126 |
| 2008/0127103 A1 * | 5/2008 | Bak | 717/126 |

(Continued)

OTHER PUBLICATIONS

"IBM Rational Functional Tester," [online] IBM Corporation Software Group, Rational Design and Development Dec. 2010 [retrieved Sep. 28, 2013], retrieved from the Internet: <http://public.dhe.ibm.com/common/ssi/ecm/en/rad14072usen/RAD14072USEN.PDF>, 4 pg.

(Continued)

*Primary Examiner* — Christopher McCarthy
(74) *Attorney, Agent, or Firm* — Yuanmin Cai; Hoffman Warnick LLC

(57) ABSTRACT

Metadata associated with at least one field defined in a user interface is identified. The metadata associated with the field defined in the user interface is processed to identify at least one characteristic of the field defined in the user interface. Based on the characteristic(s), a test string is generated for use as an input into the field defined in the user interface to perform validation on the field.

9 Claims, 3 Drawing Sheets

(56) References Cited

U.S. PATENT DOCUMENTS

| | | |
|---|---|---|
| 2008/0263526 A1 | 10/2008 | Urra et al. |
| 2011/0283261 A1 | 11/2011 | Yun |
| 2013/0198568 A1* | 8/2013 | Ahmed et al. ........... 714/32 |
| 2014/0007056 A1* | 1/2014 | Leizerovich et al. ........ 717/124 |

OTHER PUBLICATIONS

"IBM InfoSphere Optim Test Data Management," [online] IBM Software Solution Brief, 2012 [retrieved Sep. 28, 2013], retrieved from the Internet: <ftp://public.dhe.ibm.com/common/ssi/ecm/en/ims14064usen/IMS14064USEN.PDF>, 6 pg.

"Wikipedia: Visual Editor," [online] Wikipedia, the free encyclopedia, last modified Sep. 24, 2013 [retrieved Sep. 28, 2013], retrieved from the Internet: <http://en.wikipedia.org/wiki/Wikipedia:VisualEditor>, 8 pg.

Eyrich, C. et al., "Add-Ons: FxIF 0.4.7.1," [online] Mozilla Firefox, Custom License, Jul. 11, 2013 [retrieved Sep. 28, 2013], retrieved from the Internet: <https://addons.mozilla.org/en-US/firefox/addon/fxif/>, 5 pg.

"iOpus, iMacros," [online] iOpus Software © 2000-2013 iOpus GmbH [retrieved Sep. 28, 2013], retrieved from the Internet: <http://www.iopus.com/imacros/>, 4 pg.

* cited by examiner

STRING GENERATION TOOL

CROSS-REFERENCE TO RELATED APPLICATIONS

This application is a continuation of application Ser. No. 14/042,083, filed on Sep. 30, 2013, which is fully incorporated herein by reference.

BACKGROUND

Arrangements described herein relate to validation of computer software.

When computer programs are written, such software typically is subject to a myriad of tests, in a process known as validation, to ensure the programs perform as desired. In cases in which the computer programs do not pass validation, validation results typically are presented to the responsible computer programmers to help the programmers identify where flaws or errors exist on the computer programs. Such feedback is a useful tool to help the programmers identify portions of program code that need to be revised or changed.

BRIEF SUMMARY

One or more arrangements disclosed within this specification relate to validation of computer software and, more particularly, to generating test strings to be used to validate fields of a user interface.

A method of includes identifying metadata associated with at least one field defined in a user interface and processing the metadata associated with the field defined in the user interface to identify at least one characteristic of the field defined in the user interface. Based at least on the at least one characteristic, using a processor, a test string is generated for use as an input into the field defined in the user interface to perform validation on the field.

A system includes a processor programmed to initiate executable operations. The executable operations include identifying metadata associated with at least one field defined in a user interface and processing the metadata associated with the field defined in the user interface to identify at least one characteristic of the field defined in the user interface. Based at least on the at least one characteristic, a test string is generated for use as an input into the field defined in the user interface to perform validation on the field.

A computer program product includes a computer readable storage medium having program code stored thereon. The program code is executable by a processor to perform a method. The method includes identifying, by the processor, metadata associated with at least one field defined in a user interface and processing, by the processor, the metadata associated with the field defined in the user interface to identify at least one characteristic of the field defined in the user interface. Based at least on the at least one characteristic, by the processor, a test string is generated for use as an input into the field defined in the user interface to perform validation on the field.

DETAILED DESCRIPTION

Figure 1:
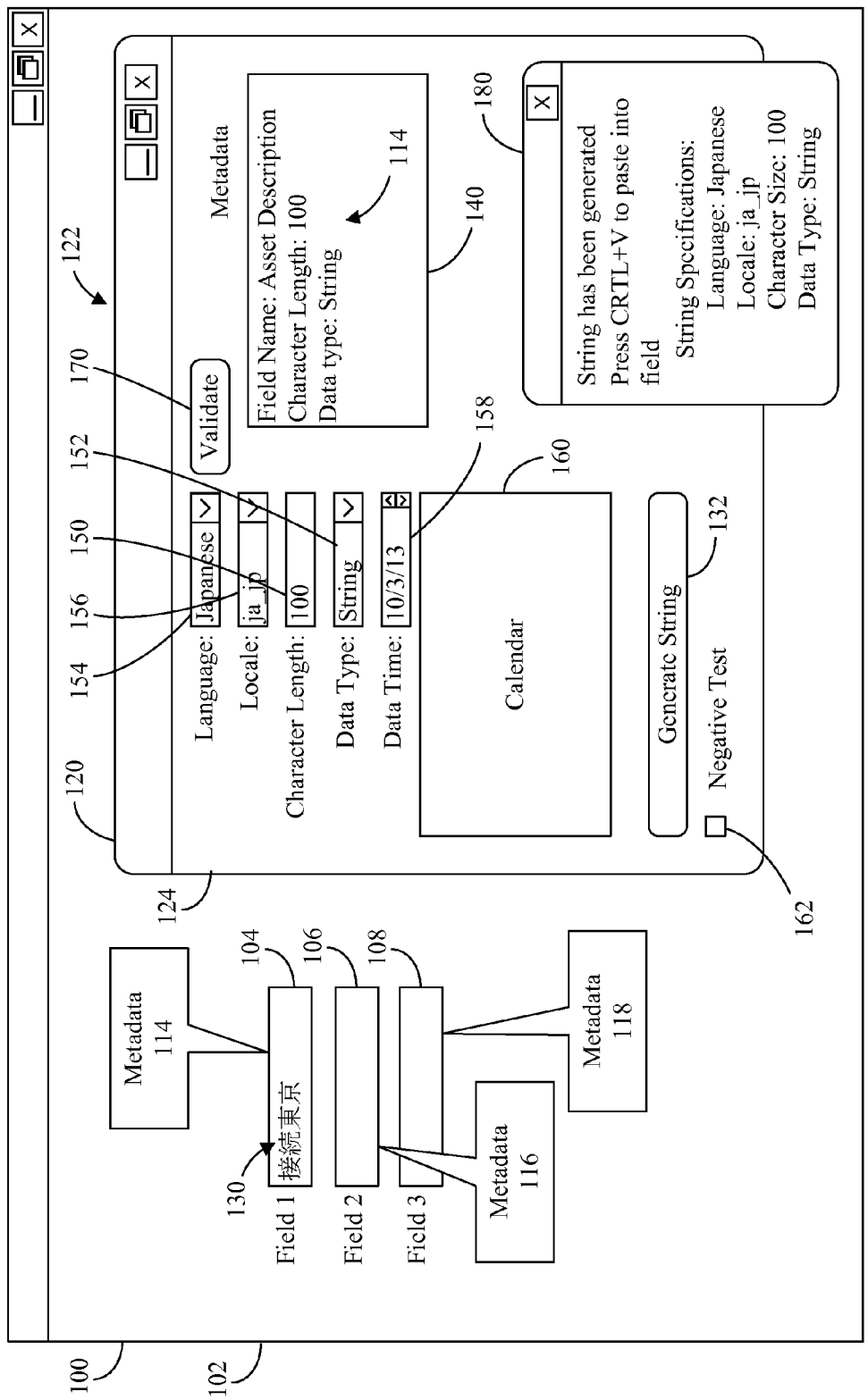
FIG. 1 depicts a view of a user interface in accordance with an arrangement disclosed within this specification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon. Any combination of one or more computer-readable medium(s) may be utilized. The computer-readable medium may be a computer-readable signal medium, a computer-readable storage medium, or a combination thereof.

As defined herein, the term "computer-readable storage medium" means a storage medium that contains or stores program code for use by or in connection with an instruction execution system, apparatus, or device. As defined herein, a "computer-readable storage medium" is not a transitory propagating signal per se. A computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Arrangements described herein relate to validation of computer software and, more particularly, to generating test strings to be used to validate fields of a user interface. Metadata associated with at least one field defined in a user interface can be identified and processed to identify at least one characteristic of the field. Based at least on that characteristic and/or one or more characteristics provided by a user, a test string is generated for use as an input into the field to perform validation on the field. The test string can be generated by a test string generation application having its own user interface presented over, or near, the user interface being validated.

Advantageously, the present arrangements save those performing validation on user interfaces much time by automatically generating test strings used for the validation. Moreover, the test strings can be generated in a desired written language for a specified locale. Thus, the user need not be fluent in the language in order to perform validation using that language.

Several additional definitions that apply throughout this document will now be presented.

As defined herein, the term "test string" means a group of one or more characters of a written language. The characters can include alphanumeric characters, symbols, punctuation and/or the like, corresponding to the written language.

As defined herein, the term "written language" means notation that represents, in writing, a language spoken among a group of people, including words, letters, numerals, graphemes, punctuations, and the like. In illustration, English, Spanish, Portuguese, German, Italian, Japanese, etc. are written languages. As defined herein, computer programming languages (e.g., Fortran, Pascal, Basic, C, C++, Javascript, etc.) are not written languages.

FIG. 1 depicts a view of a user interface 100 in accordance with one arrangement disclosed within this specification. The user interface 100 can include one or more fields 104, 106, 108 configured to receive user inputs as character strings. Metadata 114, 116, 118 can be associated with the fields 104-108. In illustration, for a particular field 104, metadata 114 can indicate a field name (e.g., a field tag), a maximum and/or minimum length of a character string that is proper for entry into the field 104, a format of a character string that is proper for entry into the field 104, a data type that is proper for entry into the field 104, and so on. Similarly, the metadata 116, 118 can indicate similar information for the respective fields 106, 108.

When the user interface 100 is being validated, a view 120 of the test string generation application 122 (hereinafter "application") can be presented to facilitate validation of the user interface 100. In one arrangement, the view 120 can be presented in a window 124 presented over a window 102 in which the field 104 is presented on a display. In one aspect, the window 124 can be presented so as to not cover the field 104. In other arrangements, the view 120 can be presented elsewhere on the display, or on another display. Indeed, the user can move the window 124 to any desired location. The view 120 can be presented when the user selects a particular field 104-108, or otherwise provides an input indicating that the user chooses to launch the application 122.

The application 122 can generate one or more test strings, for example a test string 130, which a user may use to validate the user interface 100 by entering the generated test strings into the fields 104-108. In illustration, the user can select the field 104 to perform validation of the field 104. When the field 104 is selected, the application 122 can read the metadata 114 associated with the field 104, and populate information provided by the metadata 114 into one or more fields within the view 120. For example, the view 120 can include a field 140 that presents the metadata 114 for the selected field 104. The information provided by the metadata 114 can be processed by the application 122 to generate the test string 130 for the field 104. Similarly, information provided by the metadata 116, 118 can be processed by the application 122 to generate test strings for the respective fields 106, 108.

In illustration, the user can select an element 132, such as a selectable icon, button or the like, presented in the view 120 to initiate generation of the test string 130, which the user may use as an input into the field 104 to perform validation on that field 104. In one aspect, the test string 130 can include one or more characters for the language in which the test string 130 is generated, wherein the character(s) is/are known to be problematic when an input string including the character(s) is processed. For example, in the English language, databases sometimes do not properly process a single quotation mark (i.e., "'"). Accordingly, the test string 130 can be generated to include a single quotation mark, which can facilitate identification of errors that may occur when processing a test string 130 including a single quotation mark. In one arrangement, if the character length of the test string 130 is adequately long, each character known to be problematic in the subject language can be included in the test string 130. In another arrangement, a first test string 130 that is generated can include one or more problematic characters, and subsequent test strings 130 that are generated can include other problematic characters.

In one arrangement, when the element 132 is selected to generate the test string 130, the test string 130 can be automatically entered into the field 104. In another arrangement, when the element 132 is selected to generate the test string 130, the test string 130 can be presented in a pop-up window (not shown), stored to a clip board (not shown), or the like. From the pop-up window, the clip board or another suitable data structure, the user can copy the test string 130 into the field 104. In one arrangement, when the test string 130 has been generated, the application 122 can present a view 180, such as a message window, indicating to the user the test string 130 has been generated, and instructing the user how to paste the test string 130 into the field 104. The user can follow the instructions to paste the test string 130 into the field 104. Further, the view 180 can indicate the specifications used to generate the string, for example the written language used to generate the test string 130, the locale to which the test string 130 is applicable, the character size of the test string 130, and the data type of the test string 130.

Regardless of whether the test string 130 is automatically entered into the field 104 or the user copies the test string 130 into the field 104, the computer software comprising the user interface 100 can be executed with the generated test string 130 to perform validation on the field 104. Such execution can be initiated by the user or automatically. By way of example, the user can initiate execution of the computer software by hitting an enter key on a keyboard or by placing a curser outside of the field 104. In another example, the user can initiate such execution after other fields of the user interface 100 have been filled with data.

Continuing with the previous example, from the metadata 114, certain fields of the view 120 can be automatically populated. For example, a character length field 150 and a data type field 152 can be automatically populated with parameters contained in the metadata 114. Nonetheless, the user can change or otherwise specify these parameters. For example, the user can specify the character length contained in the field 150 and/or specify the data type contained in the field 152 using a suitable user interface device, such as a mouse, a keyboard, a touchscreen, or the like. The user specified character length and/or data type may, or may not, correspond with the metadata 114. In this regard, the user can experiment with various characteristics to generate multiple test strings to be used as inputs into the fields 104-108 during validation of the user interface 100.

Further, the user can select a written language and locale for use in generating the test string 130. For example, in the language field 154 the user can select a written language and in the locale field 156 the user can select a locale. The written language can be a language spoken by intended users of the computer software (which includes the user interface 100) who are located in the locale specified in the field 156. The test string 130 can be generated to correspond to the written language and/or locale. For example, if the selected language is Japanese and the selected locale is a certain province in Japan, the test string 130 can be generated in the Japanese language common to that particular province. In this regard, the test string 130 generated by the application 122 can be both language specific and locale specific. In another example, if the selected written language is English, and the locale is the United States, dates, currencies, etc., can be formatted as such characters are conventionally formatted in the United States. For instance, the dollar symbol ("$") can be used before characters representing currency and dates can be formatted as month-day-year (e.g., Sep. 1, 2013). If, however, the written language is English, and the locale is the United Kingdom, dates, currencies, etc. can be formatted as such characters are conventionally formatted in the United Kingdom. For instance, the pound symbol ("£") can be used before characters representing currency and dates can be formatted as year-month-day (e.g., 2013 Sep. 1).

In the case that the field 104 accepts a date, a date field 158 can be used to generate dates to be used to validate the field 104. In lieu of, or in addition to, the date field 158, a calendar field 160 can be presented in the view 120 to allow a user to select a date from the calendar field 160 to validate the field 104.

The view 120 also can include a user selectable field 162 from which the user can indicate whether the test string 130 should match at least one characteristic of the selected field 104. If the user selects the field 162 to indicate a "negative test," this can indicate that the test string 130 should not match the at least one characteristic specified for the field 104. For example, if the metadata 114 or the field 150 indicates a particular character length, when the field 162 is selected, the test string 130 that is generated can have a character length different than the indicated by the metadata 114 and/or the field 150. Thus, the computer software can be tested to determine whether the computer software is able to identify that the test string 130 entered into the field 104 is improper, and thus generate an error pertaining to improper character length. When the field 162 is not selected, or the field 162 is unselected by the user, the test string 130 that is generated can have a character length that is the same as that indicated by the metadata 114 and/or the field 150. Thus, the computer software can be tested to determine whether the computer software is able to identify that the test string 130 entered into the field 104 has the proper character length, and thus does not generate an error pertaining to character length.

In addition to, or in lieu of, generating a test string 130 that may or may not have the proper character length, the field 162 can be selected to generate a test string 130 having other characteristics not suitable for the field 104. For example, when the field 162 is selected by the user, the test string 130 that is generated can have a data type incompatible with the specified data type for the field 104 (e.g., a data type that does not match at least one of the characteristics specified for the test string by the metadata 114 and/or user selections). Accordingly, the field 162 can be selected by the user to test the field 104 with regard to the computer software triggering an error or otherwise rejection inappropriate data types in the field 104. When the field 162 is not selected, the test string 130 that is generated can have a data type compatible with the specified data type for the field 104 (e.g., a data type that matches each of the characteristics specified for the test string by the metadata 114 and/or user selections).

The view 120 also can include a validate element 170, such as a selectable icon, button or the like, to validate the generated test string 130. For example, in the case that a test string 130 is generated for the field 104, the validate element 170 can be selected to validate whether the test string 130 entered into the field 104 precisely matches the test string 130 that was generated. In illustration, when the user selects the element 132 to generate a test string 130, that test string 130 can be saved to a database. In the case that the user copies the test string 130 to the field 104, the user can select the element 170 to determine whether the test string 130 contained in the field 104 precisely matches the test string 130 saved to the database. If so, the user can be presented a notification that indicates a successful validation. If not, the user can be presented a notification that indicates a validation error (i.e., the test string 130 entered into the field 104 does not precisely match the test string generated). Moreover, an indication of the differences between the test string 130 entered into the field 104 and the generated test string can be presented to the user. For example, when copying the test string from a field presenting the generated test string to the user, the user may inadvertently not select the entire test string. Moreover, a processing error by the computer used to copy the test string 130 to the field 104 may occur. Use of the validate element 170 to validate the test string 130 can alert the user of such instances.

Figure 2:
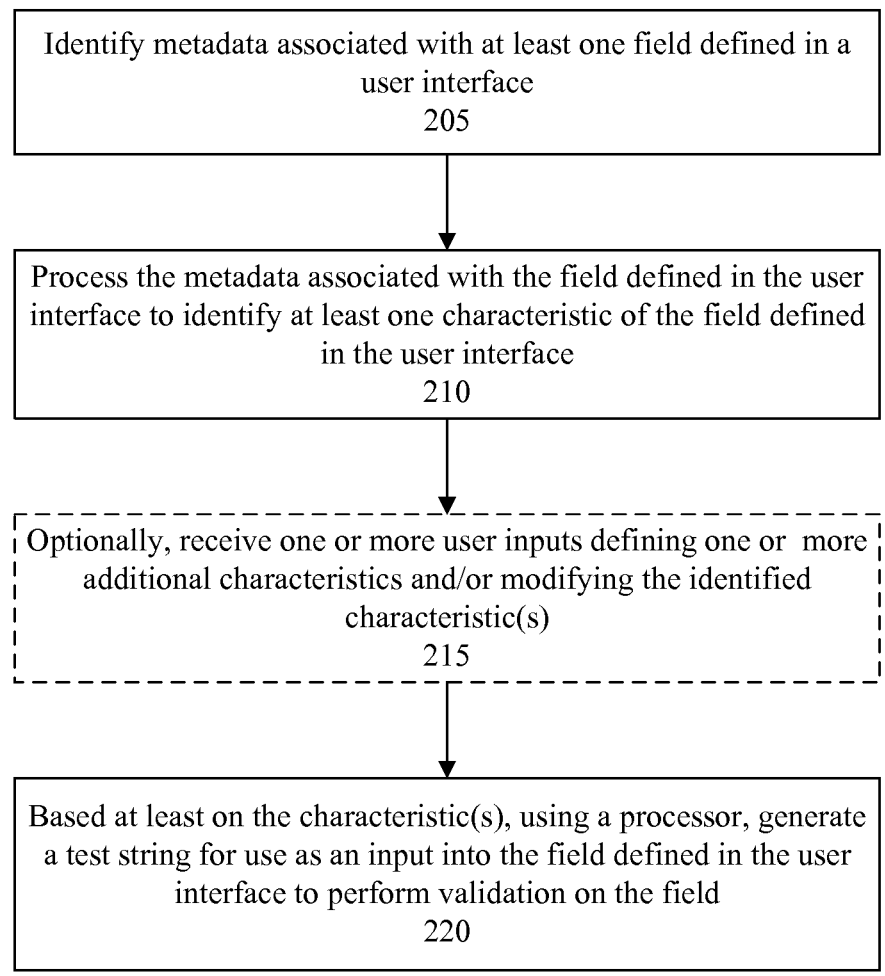
FIG. 2 is a flow chart illustrating a method of generating a test string in accordance with an arrangement disclosed within this specification.

FIG. 2 is a flow chart illustrating a method 200 of generating a test string in accordance with an arrangement disclosed within this specification. At step 205, metadata associated with at least one field defined in a user interface can be identified. For example, the metadata associated with a particular field can be identified when a user selects that field. At step 210, the metadata associated with the field defined in the user interface can be processed to identify at least one characteristic of the field defined in the user interface. Such characteristics can be presented to a user in a view in which the user may interact with an application configured to generate test strings. Optionally, at step 215, one or more user inputs can be received defining one or more additional characteristics and/or modifying the identified characteristic(s). For example, a user can change a data type, a character length, choose a language, choose a locale, etc. At step 220, based at least on the characteristic(s) (e.g., the characteristics identified from the metadata and/or characteristics selected by the user), using a processor, a test string can be generated for use as an input into the field defined in the user interface to perform validation on the field.

Figure 3:
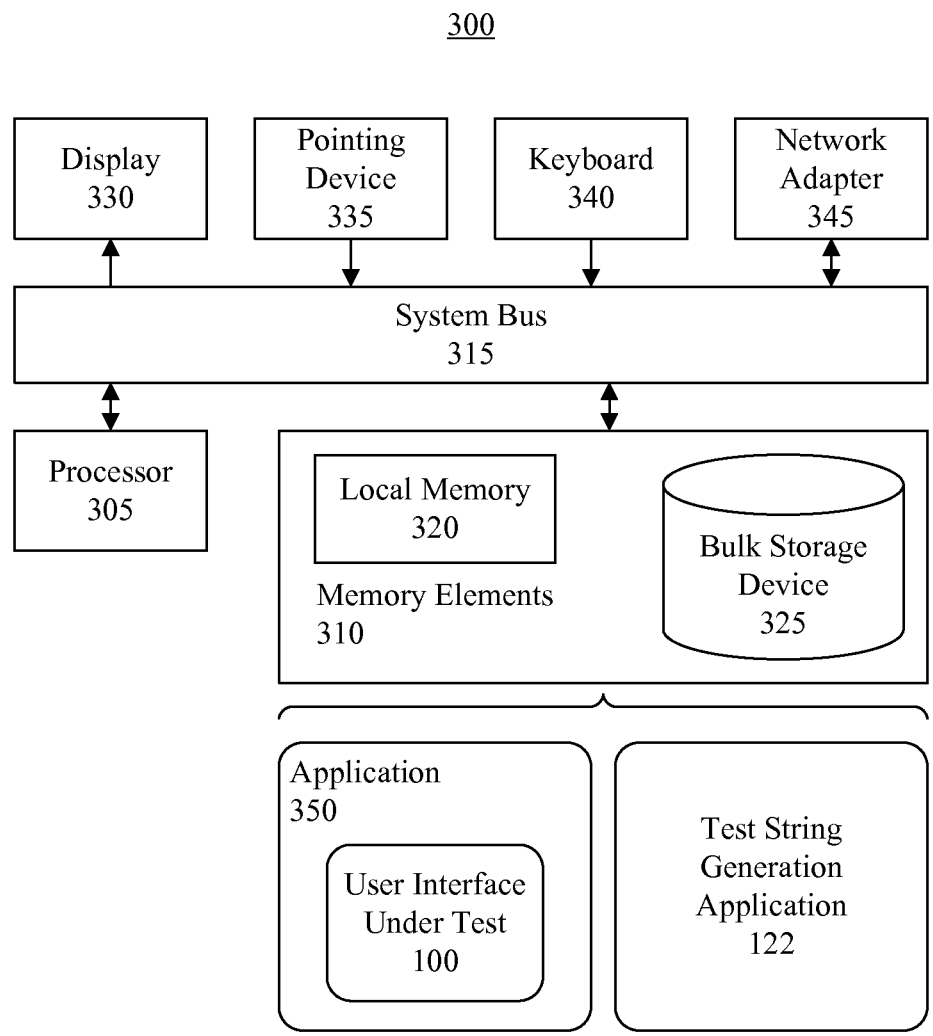
FIG. 3 is a block diagram illustrating an example of a processing system in accordance with an arrangement disclosed within this specification.

FIG. 3 is a block diagram illustrating an example of a processing system 300 in accordance with an arrangement disclosed within this specification. The processing system 300 can include at least one processor 305 (e.g., a central processing unit) coupled to memory elements 310 through a system bus 315 or other suitable circuitry. As such, the processing system 300 can store program code within the memory elements 310. The processor 305 can execute the program code accessed from the memory elements 310 via the system bus 315. It should be appreciated that the processing system 300 can be implemented in the form of any system including a processor and memory that is capable of performing the functions and/or operations described within this specification. For example, the processing system 300 can be implemented as a computer, a workstation, a mobile device (e.g., a mobile computer, a laptop computer, a tablet computer, a smart phone, a personal digital assistant, etc.), a gaming device, an appliance, and so on.

The memory elements 310 can include one or more physical memory devices such as, for example, local memory 320 and one or more bulk storage devices 325. Local memory 320 refers to RAM or other non-persistent memory device(s) generally used during actual execution of the program code. The bulk storage device(s) 325 can be implemented as a hard disk drive (HDD), solid state drive (SSD), or other persistent data storage device. The processing system 300 also can include one or more cache memories (not shown) that provide temporary storage of at least some program code in order to reduce the number of times program code must be retrieved from the bulk storage device 325 during execution.

Input/output (I/O) devices such as a display 330, a pointing device 335 and a keyboard 340 can be coupled to the processing system 300. The I/O devices can be coupled to the processing system 300 either directly or through intervening I/O controllers. For example, the display 330 can be coupled to the processing system 300 via a graphics processing unit (GPU), which may be a component of the processor 305 or a discrete device. One or more network adapters 345 also can be coupled to processing system 300 to enable processing system 300 to become coupled to other systems, computer systems, remote printers, and/or remote storage devices through intervening private or public networks. Modems, cable modems, transceivers, and Ethernet cards are examples of different types of network adapters 345 that can be used with processing system 300.

As pictured in FIG. 3, the memory elements 310 can store the components described in FIG. 1, namely the user interface 100 under test (e.g., being validated) and the test string generation application 122. Further, the memory elements 310 can store an application 350 with which the user interface 100 is associated. Being implemented in the form of executable program code, these components can be executed by the processing system 300 to perform the processes described herein and, as such, can be considered part of the processing system 300. Moreover, the user interface 100, application 350 and test string generation application 122 are functional data structures that impart functionality when employed as part of the processing system 300 of FIG. 3.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A method comprising:
   identifying metadata associated with at least one field defined in a user interface;
   processing the metadata associated with the field defined in the user interface to identify at least one characteristic of the field defined in the user interface;
   receiving from a user an indication of a character length; and
   based at least on the at least one characteristic, generating a test string for use as an input into the field defined in the user interface to perform validation on the field,
   wherein generating the test string for use as an input into the field includes generating the test string to include a number of characters corresponding to the character length.

2. The method of claim 1, further comprising:
   receiving from a user an indication of whether the test string should match the at least one characteristic;
   wherein generating the test string for use as an input into the field comprises, responsive to the indication indicating the test string should not match the at least one characteristic, generating the test string to not match the at least one characteristic.

3. The method of claim 1, further comprising:
   receiving from a user an indication of whether the test string should match the at least one characteristic;
   wherein generating the test string for use as an input into the field comprises, responsive to the indication indicating the test string should match the at least one characteristic, generating the test string to match the at least one characteristic.

4. The method of claim 1, further comprising:
   receiving from a user an indication of written language;
   wherein generating the test string for use as an input into the field comprises generating the test string to comprise characters of the written language.

5. The method of claim 1, further comprising:
   receiving from a user an indication of a locale;
   wherein generating the test string for use as an input into the field comprises generating the test string to comprise characters formatted as the characters are conventionally formatted in a written language commonly used in the locale.

6. The method of claim 1, further comprising:
   receiving from a user an indication of a data type for the test string;
   wherein generating the test string for use as an input into the field comprises formatting the test string in accordance with the data type.

7. The method of claim 1, wherein generating the test string for use as the input into the field defined in the user interface to perform validation on the field comprises:
   generating the test string to include at least one character for a language in which the test string is generated, wherein the character is known to be problematic when an input string comprising the character is processed.

8. A method comprising:
   identifying metadata associated with at least one field defined in a user interface;
   processing the metadata associated with the field defined in the user interface to identify at least one characteristic of the field defined in the user interface;
   based at least on the at least one characteristic, using a processor, generating a test string for use as an input into the field defined in the user interface to perform validation on the field;
   detecting a user has copied at least a portion of the test string into the field defined in the user interface;
   comparing the portion of the test string copied by the user into the field defined in the user interface to the generated test string; and
   responsive to determining that the portion of the test string copied by the user into the field defined in the user interface does not precisely match the generated test string, present a notification to the user of a validation error.

9. A method comprising:
   identifying metadata associated with at least one field defined in a user interface;
   processing the metadata associated with the field defined in the user interface to identify at least one characteristic of the field defined in the user interface; and
   based at least on the at least one characteristic, using a processor, generating a test string for use as an input into the field defined in the user interface to perform validation on the field;

wherein the at least one characteristic of the field defined in the user interface comprises at least one parameter selected from a group consisting of a character length and a data type.

* * * * *